US012633666B2

(12) United States Patent
Kurokawa

(10) Patent No.: US 12,633,666 B2
(45) Date of Patent: May 19, 2026

(54) ANTENNA COMPONENT

(71) Applicant: Murata Manufacturing Co., Ltd., Nagaokakyo (JP)

(72) Inventor: Takashi Kurokawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 51 days.

(21) Appl. No.: 18/641,768

(22) Filed: Apr. 22, 2024

(65) Prior Publication Data

US 2024/0275050 A1 Aug. 15, 2024

Related U.S. Application Data

(63) Continuation of application No. PCT/JP2022/032360, filed on Aug. 29, 2022.

(30) Foreign Application Priority Data

Oct. 27, 2021 (JP) ................................ 2021-175457

(51) Int. Cl.
*H01Q 7/08* (2006.01)

(52) U.S. Cl.
CPC .................................... *H01Q 7/08* (2013.01)

(58) Field of Classification Search
CPC .................................. H01Q 7/08; H01Q 7/06
See application file for complete search history.

(56) References Cited

U.S. PATENT DOCUMENTS

| | | | |
|---|---|---|---|
| 9,106,313 | B2 | 8/2015 | Ueki et al. |
| 2014/0065980 | A1 | 3/2014 | Ueki et al. |
| 2020/0036096 | A1 | 1/2020 | Kurokawa |

FOREIGN PATENT DOCUMENTS

| | | | | |
|---|---|---|---|---|
| CN | 102088128 | A | * | 6/2011 |
| JP | 2007-043588 | A | | 2/2007 |
| JP | 2007064814 | A | * | 3/2007 |
| WO | 2012/153691 | A1 | | 11/2012 |
| WO | 2018/186408 | A1 | | 10/2018 |

OTHER PUBLICATIONS

International Search Report received for PCT Patent Application No. PCT/JP2022/032360, mailed on Nov. 15, 2022, 2 pages (English Translation only).

* cited by examiner

*Primary Examiner* — Dieu Hien T Duong
(74) *Attorney, Agent, or Firm* — ArentFox Schiff LLP

(57) ABSTRACT

An antenna component includes a primary coil that has a first end and a second end and a first secondary coil that has a third end electrically connected to the first end via a capacitor and a fourth end electrically connected to the second end. The antenna component includes a first terminal electrically connected to the first end and a second terminal electrically connected to the second end. The capacitor forms a resonator with the primary coil and the first secondary coil. The first terminal and the second terminal are configured to receive a signal to the antenna component, the capacitor forms a resonator circuit with the primary coil and the first secondary coil, and the resonator circuit is configured to cause a resonance when the signal has a resonance frequency of the resonator circuit.

21 Claims, 12 Drawing Sheets

110

ANTENNA COMPONENT

CROSS REFERENCE TO RELATED APPLICATIONS

This application is a continuation of International Application No. PCT/JP2022/032360, filed Aug. 29, 2022, which claims priority to Japanese Patent Application No. 2021-175457, filed Oct. 27, 2021, the entire contents of each of which are hereby incorporated by reference in their entirety.

TECHNICAL FIELD

The present disclosure relates to an antenna component.

BACKGROUND

In some examples, a magnetic field generation circuit is known as an antenna component in related art. The magnetic field generation circuit includes a transformer and a resonant capacitor. The transformer includes a primary coil and a secondary coil. The resonant capacitor is connected in parallel to the secondary coil. With this configuration, the secondary coil and the resonant capacitor form a parallel resonant circuit. Alternating-current voltage is applied to the primary coil. The frequency of the alternating-current voltage is equal to the resonant frequency of the parallel resonant circuit. Accordingly, resonance occurs in the parallel resonant circuit. As a result, a magnetic field is efficiently radiated from a secondary antenna. An example circuit is described in International Publication No. 2018/186408.

SUMMARY OF THE INVENTION

The magnetic field generation circuit described in International Publication No. 2018/186408 makes a request for stronger magnetic field coupling between the primary coil and the secondary coil.

In order to meet the above request, it is an object of the present disclosure to provide an antenna component capable of increasing the magnetic field coupling between the primary coil and the secondary coil.

An antenna component according to an exemplary embodiment of the present disclosure includes a magnetic core, a primary coil that is wound around the magnetic core and that has a first end and a second end, a first secondary coil that is wound around the magnetic core and that has a third end electrically connected to the first end via a capacitor and a fourth end electrically connected to the second end, a first terminal electrically connected to the first end, and a second terminal electrically connected to the second end. The first terminal and the second terminal are configured to receive a signal to the antenna component, the capacitor forms a resonator circuit with the primary coil and the first secondary coil, and the resonator circuit is configured to cause a resonance when the signal has a resonance frequency of the resonator circuit.

In some exemplary embodiments, a signal is input through the first terminal and the second terminal.

In some exemplary embodiments, a turning direction of the first secondary coil when viewed from the fourth end toward the third end is the same as a turning direction of the primary coil when viewed from the first end toward the second end.

In some exemplary embodiments, the antenna component further includes the capacitor that forms a resonator with the primary coil and the first secondary coil.

In some exemplary embodiments, the capacitor is provided outside the antenna component and forms a resonant circuit with the primary coil and the first secondary coil.

The definitions of terms in this description will be described here. In this description, axes and members extending in the front-back direction do not necessarily indicate axes and members parallel to the front-back direction. According to an exemplary aspect, the axes and members extending in the front-back direction mean axes and members that are inclined in a range of ±45° C. with respect to the front-back direction. Similarly, axes and members extending in the up-down direction mean axes and members that are inclined in a range of ±45° C. with respect to the up-down direction. Axes and members extending in the left-right direction mean axes and members that are inclined in a range of ±45° C. with respect to the left-right direction.

The positional relationship between members in this description will be described here. X to Z are members or components of an antenna component. In this description, X and Y arranged in the front-back direction indicate the following state. X and Y arranged in the front-back direction indicate a state in which both X and Y are arranged on an arbitrary straight line indicating the front-back direction when X and Y are viewed in a direction perpendicular to the front-back direction. In this description, X and Y arranged in the front-back direction when viewed in the up-down direction indicate the following state. Both X and Y are arranged on an arbitrary straight line indicating the front-back direction when X and Y are viewed in the up-down direction. In this case, when X and Y are viewed from the left-right direction different from the up-down direction, either of X and Y is not necessarily arranged on the arbitrary straight line indicating the front-back direction. X may be in contact with Y. X may be apart from Y. Z may exist between X and Y. This definition applies to a direction other than the front-back direction.

In this description, arrangement of X on Y indicates the following state. At least part of X is arranged directly above Y. Accordingly, when viewed in the up-down direction, X is overlapped with Y. This definition applies to a direction other than the up-down direction.

In this description, arrangement of X above Y includes a case in which at least part of X is positioned directly above Y and a case in which X is not positioned directly above Y but positioned obliquely above Y. In this case, X is not necessarily overlapped with Y when viewed in the up-down direction. For purposes of this disclosure, the term "obliquely above" means, for example, left above or right above. Moreover, this definition applies to a direction other than the up-down direction.

In this description and for purposes of this disclosure, the respective components of X are defined in the following manner unless otherwise specified. In particular, the "front portion of X" means the front half of X. The "back portion of X" means the back half of X. The "left portion of X" means the left half of X. The "right portion of X" means the right half of X. The "upper portion of X" means the upper half of X. The "lower portion of X" means the lower half of X. The "front end of X" means the end in the frontward direction of X. The "back end of X" means the end in the backward direction of X. The "left end of X" means the end in the leftward direction of X. The "right end of X" means the end in the rightward direction of X. The "upper end of X" means the end in the upward direction of X. The "lower end of X" means the end in the downward direction of X. The "front end portion of X" means the front end of X and the neighborhood thereof. The "back end portion of X" means the back end of X and the neighborhood thereof. The "left end portion of X" means the left end of X and the neighborhood thereof. The "right end portion of X" means the right end of X and the neighborhood thereof. The "upper end portion of X" means the upper end of X and the neighborhood thereof. Finally, the "lower end portion of X" means the lower end of X and the neighborhood thereof.

According to exemplary aspects, some exemplary embodiments of the present disclosure increases the magnetic field coupling between a primary coil and a resonant coil including the primary coil and a secondary coil while suppressing complication of the structure of an antenna component.

DETAILED DESCRIPTION OF EMBODIMENTS

Exemplary Embodiments

[Structure of Antenna Component 10]

Figure 1:
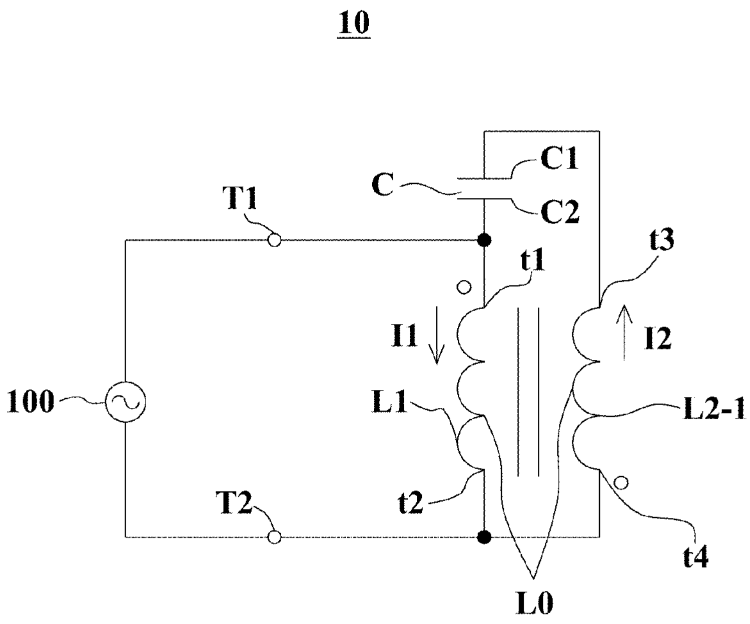
FIG. 1 is a circuit diagram of an antenna component 10.
Figure 2:
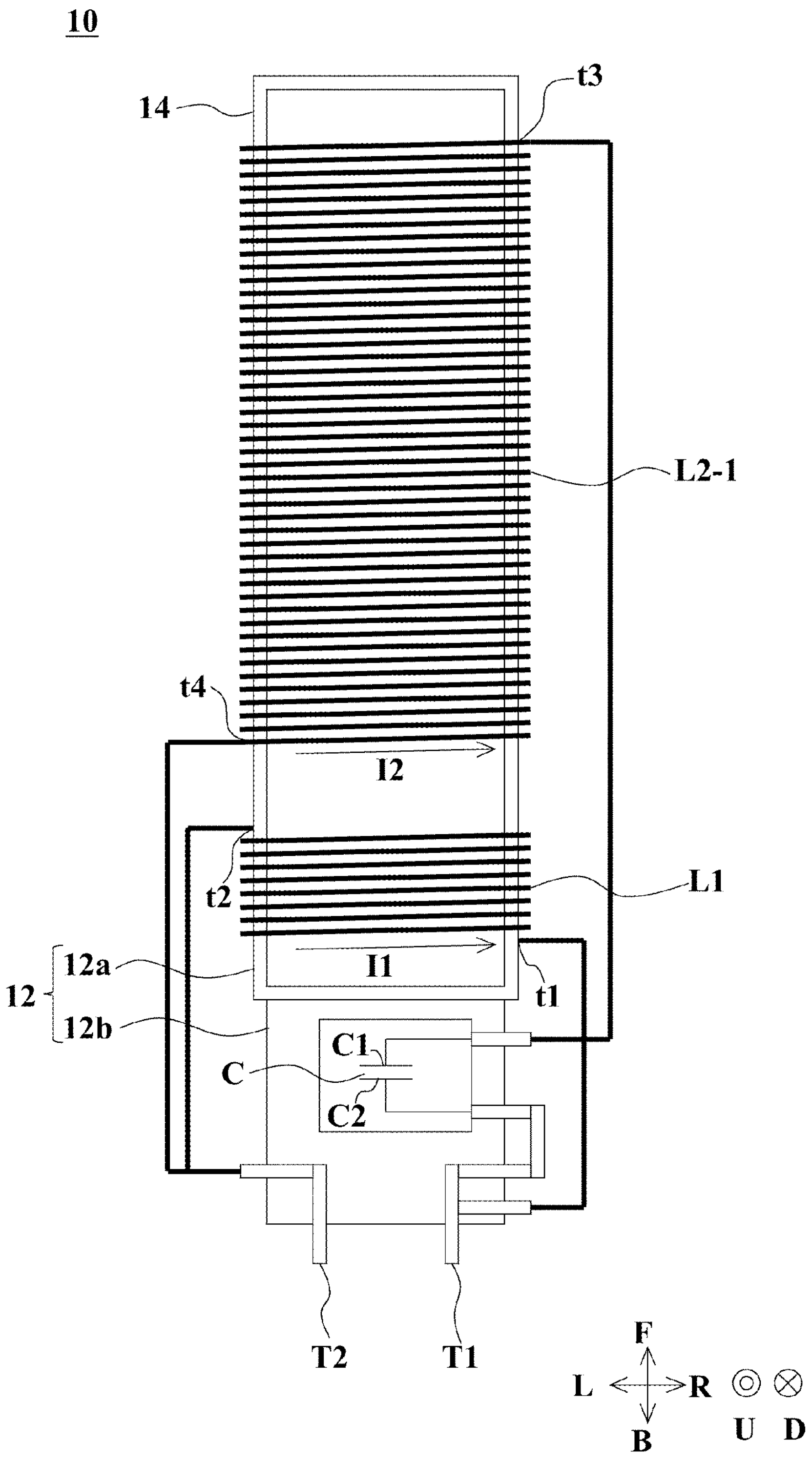
FIG. 2 is a top view of the antenna component 10.

The structure of an antenna component 10 according to an exemplary embodiment of the present disclosure will herein be described with reference to the drawings. FIG. 1 is a circuit diagram of the antenna component 10. FIG. 2 is a top view of the antenna component 10.

The direction in which a primary coil L1 and a first secondary coil L2-1 are arranged is defined as the front-back direction in the following description, as illustrated in FIG. 2. In some exemplary embodiments, a magnetic core 14 has a flat-plate shape having an upper main surface and a lower main surface. The normal direction of the upper main surface and the lower main surface of the magnetic core 14 is defined as the up-down direction. The left-right direction is orthogonal to the front-back direction and the up-down direction. The front-back direction, the left-right direction, and the up-down direction are directions that are defined for convenience and do not necessarily coincide the front-back direction, the left-right direction, and the up-down direction when the antenna component 10 is practically used.

In some exemplary embodiments, the antenna component 10 is an antenna component for transmission of a short range communication system in a very low frequency (VLF) band (3 kHz to 30 kHz), a low frequency (LF) band (30 kHz to 300 kHz), or the like. The antenna component 10 is mainly used for a keyless entry system that remotely operates locking and unlocking of a vehicle door. The antenna component 10 may be used for near field communication (NFC) or may be used for a magnetic field resonance wireless power transfer system.

In the circuit configuration of the present disclosure, the antenna component 10 includes a main body 12, the magnetic core 14, a first terminal T1, a second terminal T2, the primary coil L1, the first secondary coil L2-1, and a capacitor C, as illustrated in FIG. 1 and FIG. 2.

The main body 12 includes a frame portion 12*a* and a mounting portion 12*b*, as illustrated in FIG. 2. The frame portion 12*a* has a frame shape having a rectangular outer edge when viewed in the up-down direction. The long sides of the frame portion 12*a* extend in the front-back direction. The short sides of the frame portion 12*a* extend in the left-right direction. The mounting portion 12*b* has a plate shape. Accordingly, the mounting portion 12*b* has an upper main surface and a lower main surface. The mounting portion 12*b* has a rectangular shape when viewed in the up-down direction. The long sides of the mounting portion 12*b* extend in the front-back direction. The short sides of the mounting portion 12*b* extend in the left-right direction. The front short side of the mounting portion 12*b* is in contact with the back short side of the frame portion 12*a*. The frame portion 12*a* and the mounting portion 12*b* having the above structures are integrally formed and are formed into one member. The material of the main body 12 is an insulating material. The material of the main body 12 is, for example, resin, such as polybutylene terephthalate (PBT).

In some exemplary embodiments, the magnetic core 14 has a bar shape extending in the front-back direction. More specifically, the magnetic core 14 has a plate shape. Accordingly, the magnetic core 14 has an upper main surface and a lower main surface. The magnetic core 14 has a rectangular shape when viewed in the up-down direction. The long sides of the magnetic core 14 extend in the front-back direction. The short sides of the magnetic core 14 extend in the left-right direction. The magnetic core 14 is mounted to the frame portion 12*a*. The magnetic core 14 is surrounded by the frame portion 12*a* when viewed in the up-down direction. The material of the magnetic core 14 is a magnetic material. The material of the magnetic core 14 is, for example, Mn—Zn system ferrite or another amorphous magnetic body.

In some exemplary embodiments, the primary coil L1 is wound around the magnetic core 14. In the present exemplary embodiment, the primary coil L1 is wound around the magnetic core 14 and the frame portion 12*a*. The primary coil L1 has a first end t1 and a second end t2. The first end t1 is positioned behind the second end t2. Accordingly, the first end t1 is a back end of the primary coil L1. The second end t2 is a front end of the primary coil L1. The primary coil L1 has a helical shape advancing forward while turning around clockwise, when viewed in the front direction. Accordingly, the primary coil L1 turns around clockwise when viewed from the first end t1 toward the second end t2. The primary coil L1 is a lead made of a conductive material, such as copper.

According to some exemplary aspects, the first secondary coil L2-1 is positioned ahead of the primary coil L1. In other words, the first secondary coil L2-1 and the primary coil L1 are arranged in this order from the front to the back. The first secondary coil L2-1 is wound around the magnetic core 14. The first secondary coil L2-1 is wound around the magnetic core 14 and the frame portion 12*a*. The first secondary coil L2-1 has a third end t3 and a fourth end t4. The third end t3 is positioned ahead of the fourth end t4. Accordingly, the third end t3 is a front end of the first secondary coil L2-1. The fourth end t4 is a back end of the first secondary coil L2-1. The third end t3 is electrically connected to the first end t1 via the capacitor C described below. The fourth end t4 is electrically connected to the second end t2. The first secondary coil L2-1 has a helical shape advancing forward while turning around clockwise, when viewed in the front direction. Accordingly, the first secondary coil L2-1 turns around clockwise when viewed from the fourth end t4 toward the third end t3. With this configuration, the turning direction of the first secondary coil L2-1 when viewed from the fourth end t4 toward the third end t3 is the same as the turning direction of the primary coil L1 when viewed from the first end t1 toward the second end t2. The number of turns of the first secondary coil L2-1 is greater than the number of turns of the primary coil L1. The first secondary coil L2-1 is a lead made of a conductive material, such as copper.

In some exemplary embodiments, the first terminal T1 is electrically connected to the first end t1. The first terminal T1 is fixed at a right portion of the upper main surface of the mounting portion 12*b*. The first terminal T1 is projected backward from the mounting portion 12*b*. The second terminal T2 is electrically connected to the second end t2. The second terminal T2 is fixed at a left portion of the upper main surface of the mounting portion 12*b*. The second terminal T2 is projected backward from the mounting portion 12*b*. The first terminal T1 is a single metal member. The second terminal T2 is a single metal member. The material of the first terminal T1 and the second terminal T2 is a conductive material, such as copper.

According to some exemplary aspects, the capacitor C forms a resonator with the primary coil L1 and the first secondary coil L2-1. The primary coil L1 and the first secondary coil L2-1 are defined as a resonant coil L0. Accordingly, the capacitor C forms the resonator with the resonant coil L0. The capacitor C is, for example, a chip electronic component. The capacitor C is mounted on the upper main surface of the mounting portion 12*b*, as illustrated in FIG. 2. The capacitor C includes a first capacitor electrode C1 and a second capacitor electrode C2. The first capacitor electrode C1 is electrically connected to the third end t3. The second capacitor electrode C2 is electrically connected to the first end t1. More specifically, the second capacitor electrode C2 is electrically connected to the first terminal T1 to be electrically connected to the first end t1 via the first terminal T1.

In the antenna component 10 having the above structure, the primary coil L1 and the resonant coil L0 are magnetically coupled to each other to form a transformer. More specifically, the first terminal T1 and the second terminal T2 are connected to a signal source 100, as illustrated in FIG. 1. The signal source 100 generates a radio-frequency signal. The frequency of the radio-frequency signal is equal to the resonant frequency of a resonant circuit. In some exemplary embodiments, the state in which the two frequencies are equal to each other can include a shift on the order of several hertz. Accordingly, the radio-frequency signal (signal) is input thorough the first terminal T1 and the second terminal T2. The primary coil L1 is magnetically coupled to the first secondary coil L2-1 so that resonant current I2 flows through the resonant coil L0 from the first end t1 to the third end t3 via the second end t2 and the fourth end t4 when input current I1 flows through the primary coil L1 from the first end t1 to the second end t2.

According to some exemplary aspects, upon application of input voltage V1 to the primary coil L1 from the first end t1 to the second end t2 and flowing of the input current I1, the primary coil L1 generates a magnetic field in the back direction. Since the magnetic field passes through the first secondary coil L2-1, mutual induction electromotive force V2 caused by a voltage transformation ratio (determined by the number of turns and the coupling coefficient) between the primary coil L1 and the resonant coil L0 occurs at the third end t3. Current of $2\pi fCV2$ flows thorough the capacitor C due to this mutual induction electromotive force. In a resonant state, parallel resonant current flows between the resonant coil L0 and the capacitor C. The value of the parallel resonance current is $I2=V2/2\pi fL=2\pi fCV2$ and input impedance has a local maximum at this value. As a result, the antenna component 10 is capable of gaining the large resonant current I2 with the small input current I1. The antenna component 10 is capable of radiating the strong magnetic field into the air. The antenna component 10 is also capable of receiving the magnetic field.

[Advantages]

In the antenna component 10, the primary coil L1 is used for both the input coil and the resonant coil. Accordingly, the input coil is capable of being arranged so as to be extremely adjacent to the resonant coil. As a result, it is possible to increase the magnetic field coupling between the primary coil L1 and the resonant coil L0 in the antenna component 10.

In addition, with the antenna component 10, it is possible to increase the magnetic field coupling between the primary coil L1 and the first secondary coil L2-1 also for the following reason. More specifically, the turning direction of the first secondary coil L2-1 when viewed from the fourth end t4 toward the third end t3 is the same as the turning direction of the primary coil L1 when viewed from the first end t1 toward the second end t2. Accordingly, the resonant current I2 flows and, thus, the direction of the magnetic field occurring at the primary coil L1 coincides with the direction of the magnetic field occurring at the first secondary coil L2-1. Consequently, the magnetic field coupling between the primary coil L1 and the first secondary coil L2-1 is increased.

Figure 3:
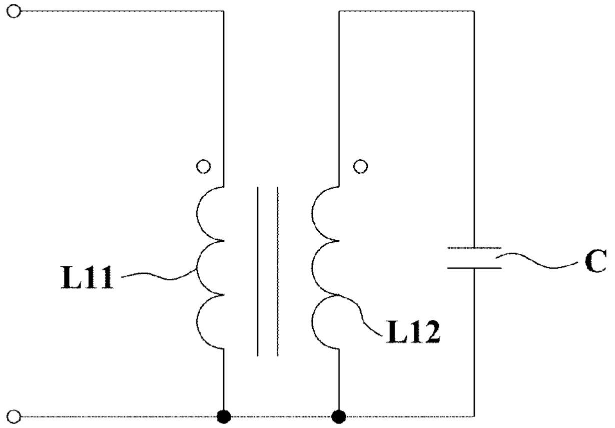
FIG. 3 is a circuit diagram of an antenna component 110 according to a comparative example.
Figure 4:
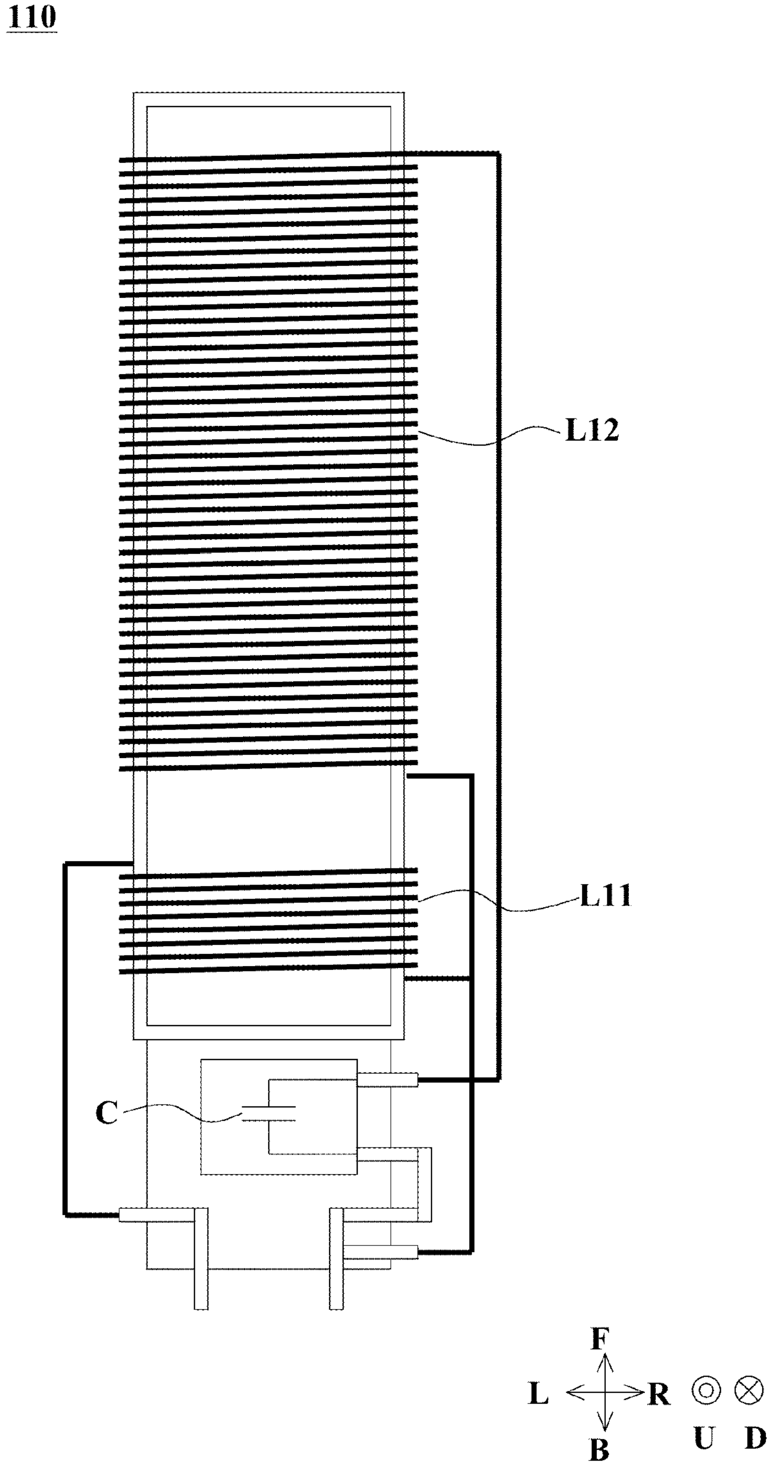
FIG. 4 is a top view of the antenna component 110 according to the comparative example.

The increase in the magnetic field coupling between the primary coil L1 and the resonant coil L0 suppresses occurrence of distortion in the waveform of magnetic flux density radiated from the resonant coil L0. This will be described with reference to the drawings. FIG. 3 is a circuit diagram of an antenna component 110 according to a comparative example. FIG. 4 is a top view of the antenna component 110 according to the comparative example.

In the antenna component 110, a secondary coil L12 and the capacitor C form a resonant circuit. A radio-frequency signal having a frequency equal to the resonant frequency of the resonant circuit is input into the primary coil L11. The primary coil L11 is magnetically coupled to the secondary coil L12. Current flows through the secondary coil L12 due to electromagnetic induction. Since the frequency of the radio-frequency signal is equal to the frequency of the resonant circuit, resonance occurs at the resonant circuit. As a result, the secondary coil L12 radiates the magnetic field into the air. However, the magnetic field coupling between the primary coil L11 and the secondary coil L12 is generally weak in the antenna component 110.

In contrast, in the antenna component 10, the resonant coil L0 and the capacitor C form the resonant circuit. Part of the resonant coil is shared with the primary coil L1, and both of the coils are completely magnetically coupled to each other in the shared portion. In addition, the direction in which the resonant current I2 flows through the primary coil L1 coincides with the direction in which the resonant current I2 flows through the first secondary coil L2-1. Accordingly, the degree of coupling between the primary coil L1 and the resonant coil L0 is extremely high. The increase in the magnetic field coupling between the primary coil L1 and the resonant coil L0 suppresses occurrence of an unnecessary inductance component in the antenna component 10. In other words, the unnecessary inductance component is difficult to occur in the antenna component 10, compared with the antenna component 110. As a result, abnormal oscillation is difficult to occur in the antenna component 10, compared with the antenna component 110. Accordingly, the occurrence of the distortion in the waveform of the strength of the magnetic field radiated from the first secondary coil L2-1 is suppressed in the antenna component 10.

According to an exemplary aspect, measurement using an actual machine is performed on the antenna component 10 and the antenna component 110 in order to further clarify the advantages achieved by the antenna component 10. Specifically, the radio-frequency signal was input into the antenna components 110 and 10 to measure the resonant current I2. However, the magnetic flux density that is radiated is proportional to the resonant current I2. Here, the radio-frequency signal having a frequency equal to the resonant frequency of the resonant circuit was input into each of the antenna components 110 and 10. The radio-frequency signal is rectangular waves having Hi periods and Low periods.

Figure 5:
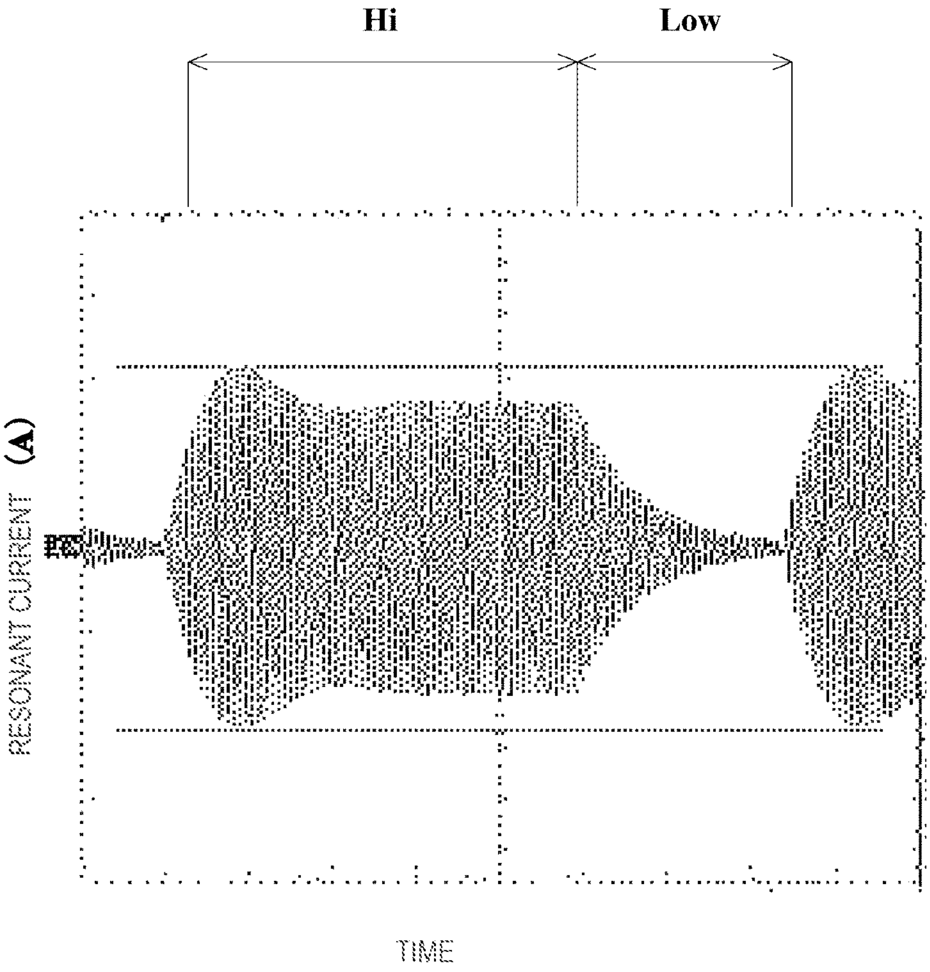
FIG. 5 indicates the waveform of resonant current I2 when a radio-frequency signal having a frequency equal to the resonant frequency of a resonant circuit was input into the antenna component 110.
Figure 6:
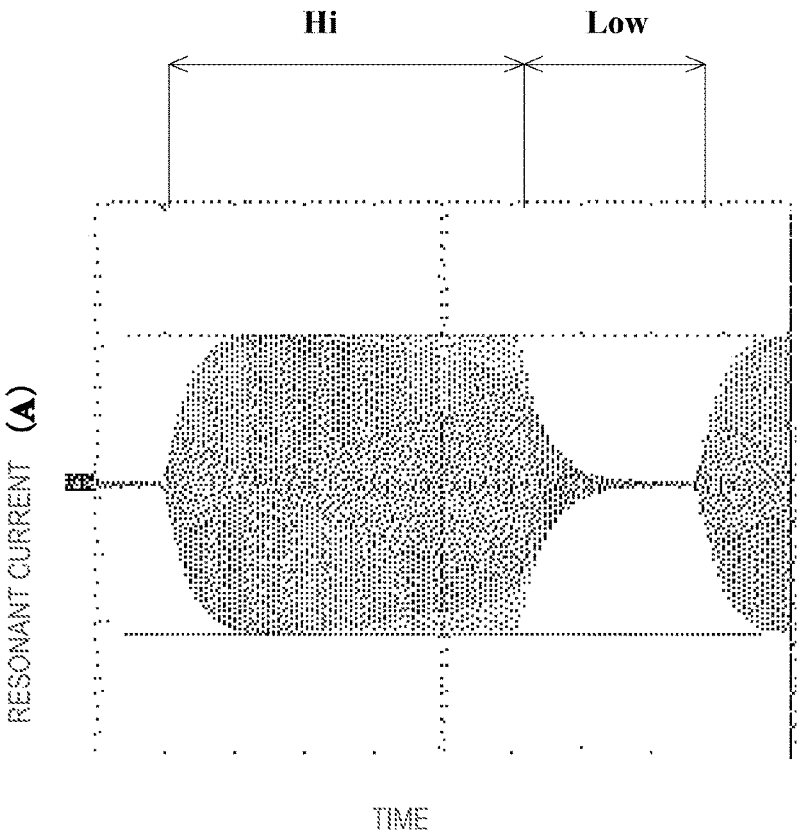
FIG. 6 indicates the waveform of the resonant current I2 when the radio-frequency signal having a frequency equal to the resonant frequency of the resonant circuit was input into the antenna component 10.

FIG. 5 indicates the waveform of the resonant current I2 when the radio-frequency signal having a frequency equal to the resonant frequency of the resonant circuit was input into the antenna component 110. FIG. 6 indicates the waveform of the resonant current I2 when the radio-frequency signal having a frequency equal to the resonant frequency of the resonant circuit was input into the antenna component 10. Referring to FIG. 5 and FIG. 6, the vertical axis represents current value, and the horizontal axis represents time.

As illustrated in FIG. 5, abnormal distortion occurred in the output pattern of the resonant current in the antenna component 110.

In contrast, as illustrated in FIG. 6, no abnormal distortion occurred in the output pattern of the resonant current in the antenna component 10. This indicates that the increase in the magnetic field coupling between the primary coil L1, and the first secondary coil L2-1 suppresses the occurrence of the distortion in the waveform of the strength of the magnetic field radiated by the first secondary coil L2-1 into the air.

As described above, the antenna having the transformer structure is required to increase the magnetic field coupling between the primary coil and the secondary coil. A general method to increase the magnetic field coupling between the primary coil and the secondary coil is exemplified by, for example, a method of winding the primary coil around the secondary coil so that the primary coil is overlapped with the secondary coil. In this case, the antenna component is required to have the structure in which the primary coil is wound around the secondary coil. Accordingly, it is necessary to provide a component to insulate the primary coil from the secondary coil, a component to keep the distance between the primary coil and the secondary coil to a certain value, and so on to increase the number of the components in the antenna component. In addition, it is necessary to uniformly wound the primary coil around the secondary coil to complicate the manufacturing process of the antenna component. As a result, it is difficult to manufacture the antenna component.

Figure 8:
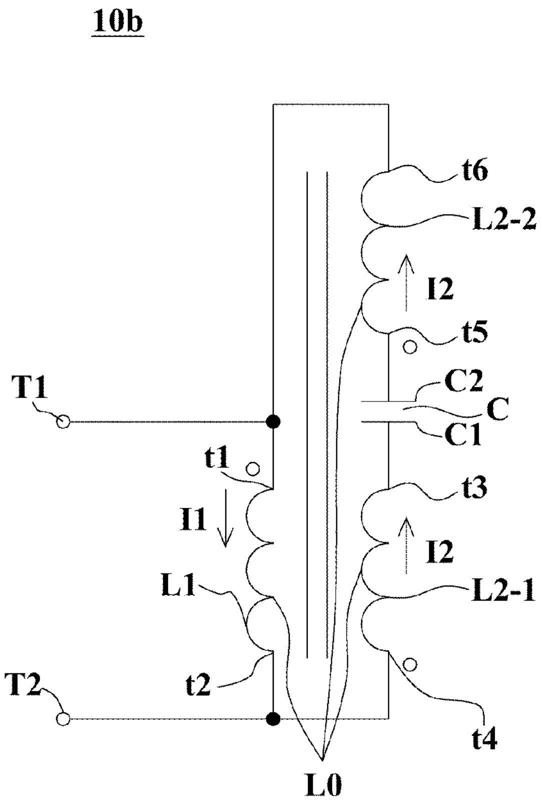
FIG. 8 is a circuit diagram of an antenna component 10*b*.

In contrast, since the magnetic field coupling between the primary coil L1 and the resonant coil L0 is increased in the antenna component 10 even when the primary coil L1 is arranged so as not to be overlapped with the first secondary coil L2-1 as in FIG. 8, it is not necessary to wound the primary coil L1 around the first secondary coil L2-1. Accordingly, the increase in the number of the components in the antenna component 10 is suppressed and the manufacturing process of the antenna component 10 is simplified. As a result, it is easy to manufacture the antenna component 10. This achieves cost reduction and improvement of the quality of the antenna component 10.

(First Modification)

Figure 7:
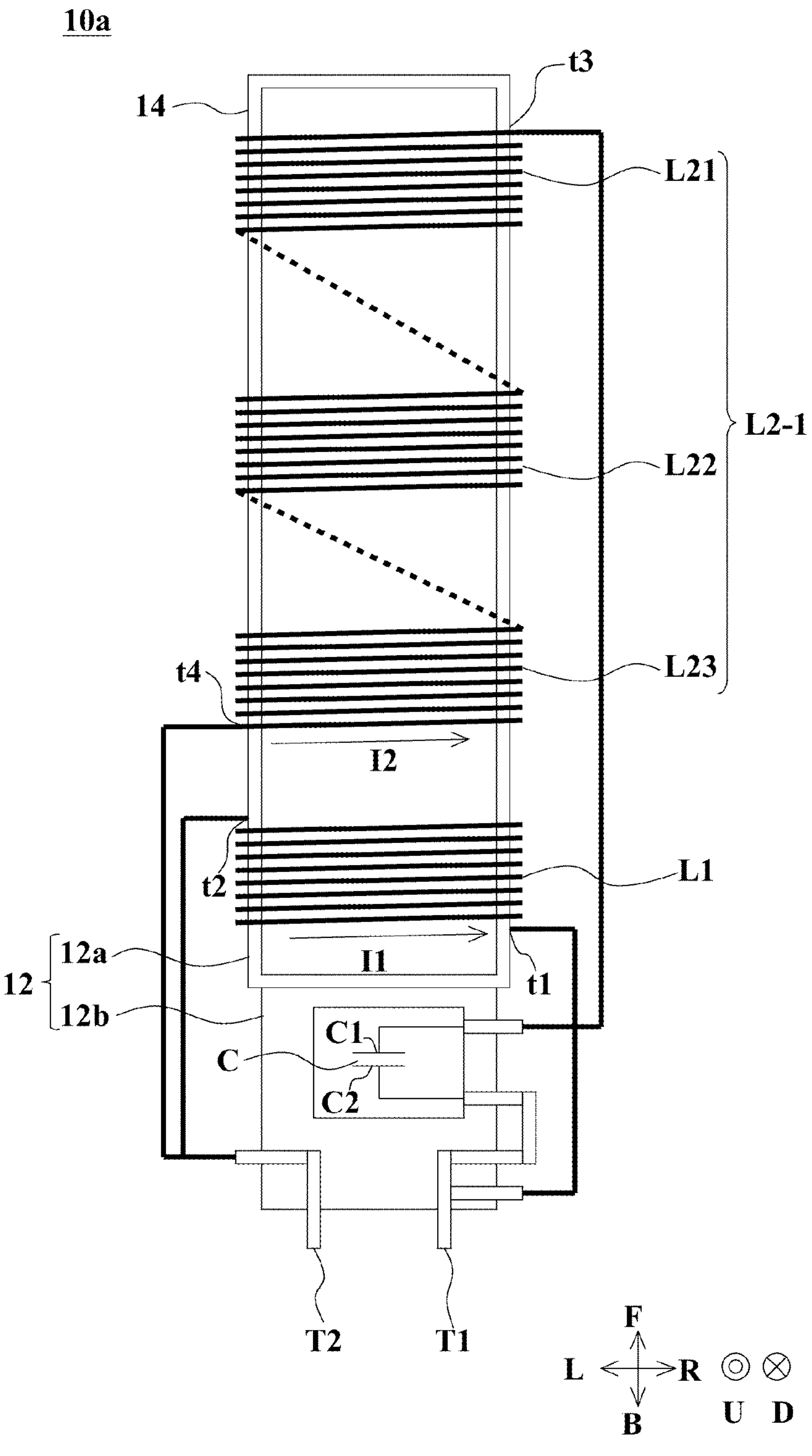
FIG. 7 is a top view of an antenna component 10*a*.

An antenna component 10*a* according to a first modification will be described here with reference to the drawing. FIG. 7 is a top view of the antenna component 10*a*.

The antenna component 10*a* differs from the antenna component 10 in that the first secondary coil L2-1 includes a first secondary coil first portion L21, a first secondary coil second portion L22, and a first secondary coil third portion L23. The first secondary coil first portion L21, the first secondary coil second portion L22, and the first secondary coil third portion L23 are connected in series to each other and are arranged at intervals in this order from the front to the back. Since the other structure of the antenna component 10*a* is the same as that of the antenna component 10, a description of the other structure of the antenna component 10*a* is omitted herein. The antenna component 10*a* is capable of achieving the same effects and advantages as those of the antenna component 10.

In addition, in the antenna component 10*a*, the first secondary coil first portion L21, the first secondary coil second portion L22, and the first secondary coil third portion L23 are connected in series to each other and are arranged at intervals in this order from the front to the back. Accordingly, it is possible to adjust the strength of the magnetic field coupling between the primary coil L1 and the first secondary coil L2-1 by adjusting the spacing between the first secondary coil first portion L21 and the first secondary coil second portion L22 or the spacing between the first secondary coil second portion L22 and the first secondary coil third portion L23.

(Second Modification)

Figure 9:
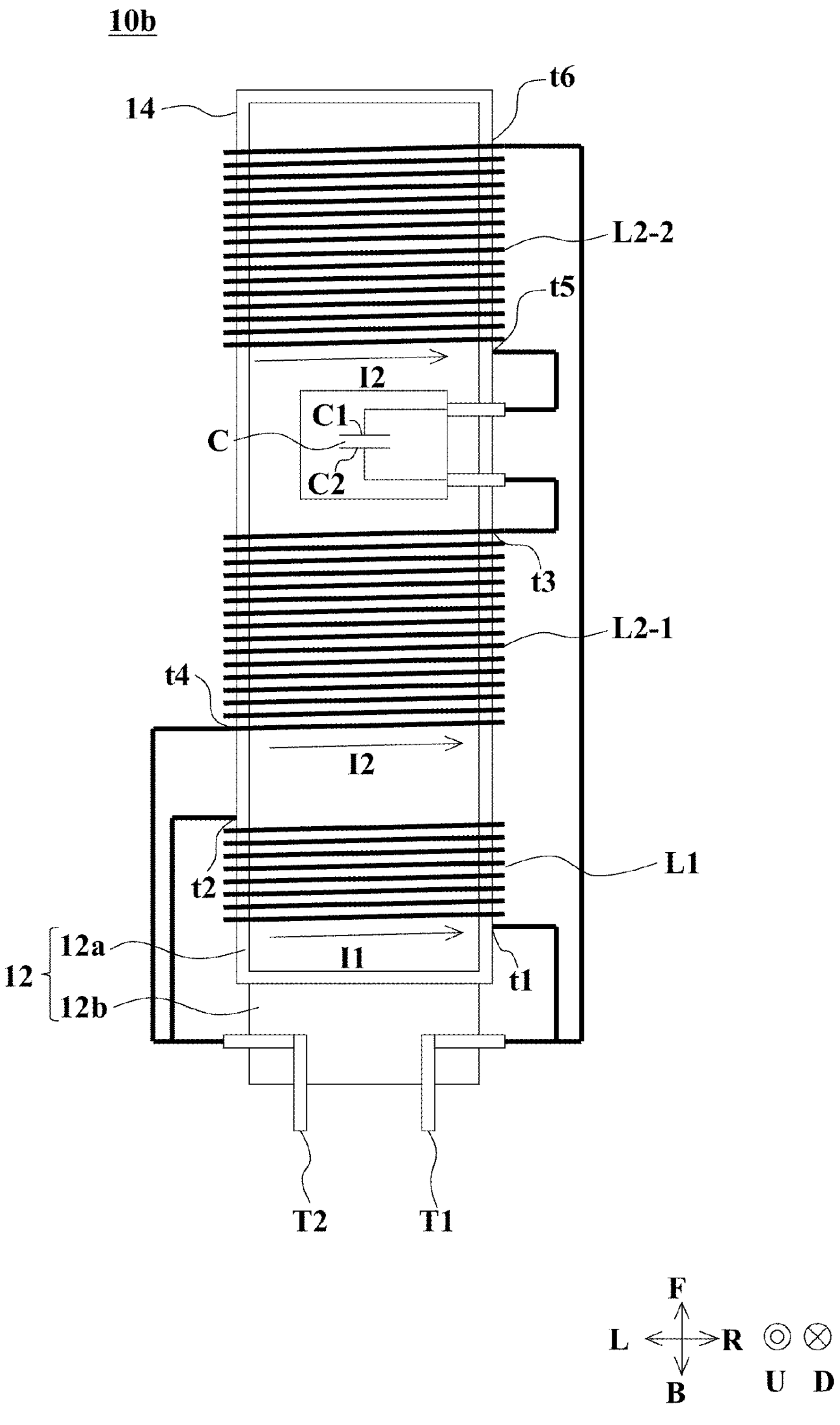
FIG. 9 is a top view of the antenna component 10*b*.

An antenna component 10*b* according to a second modification will be described here with reference to the drawings. FIG. 8 is a circuit diagram of the antenna component 10*b*. FIG. 9 is a top view of the antenna component 10*b*.

The antenna component 10*b* differs from the antenna component 10 in that the antenna component 10*b* further includes a second secondary coil L2-2. More specifically, the second secondary coil L2-2 is wound around the magnetic core 14. The second secondary coil L2-2, the first secondary coil L2-1, and the primary coil L1 are arranged in this order from the front to the back. The capacitor C is positioned between the first secondary coil L2-1 and the second secondary coil L2-2.

The second secondary coil L2-2 is connected in series to the capacitor C. The third end t3 is electrically connected to the first end t1 via the capacitor C and the second secondary coil L2-2. The second secondary coil L2-2 has a fifth end t5 and a sixth end t6. The fifth end t5 is electrically connected to the third end t3 via the capacitor C. The sixth end t6 is electrically connected to the first end t1. The turning direction of the second secondary coil L2-2 when viewed from the sixth end t6 toward the fifth end t5 is the same as the turning direction of the primary coil L1 when viewed from the first end t1 toward the second end t2.

In the antenna component 10*b* described above, the primary coil L1 and the resonant coil L0 (the primary coil L1, the first secondary coil L2-1, and the second secondary coil L2-2) are magnetically coupled to each other so that the resonant current I2 flows through the primary coil L1, the first secondary coil L2-1, and the second secondary coil L2-2 from the first end t1 to the sixth end t6 when the input current I1 flows through the primary coil L1 from the first end t1 to the second end t2. Since the other structure of the antenna component 10*b* is the same as that of the antenna component 10, a description of the other structure of the antenna component 10*b* is omitted herein.

In the antenna component 10*b*, the capacitor C is positioned between the first secondary coil L2-1 and the second secondary coil L2-2. Accordingly, the first secondary coil L2-1 and the second secondary coil L2-2 are capable of being positioned over the magnetic core 14. Consequently, it is possible to suppress the length in the front-back direction of the antenna component 10*b* without reducing the radiation efficiency of the magnetic field.

(Third Modification)

Figure 10:
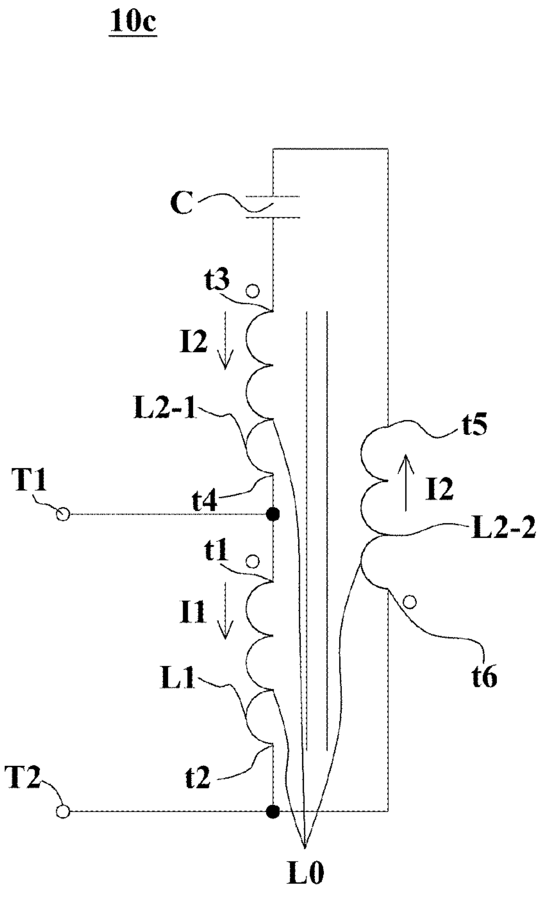
FIG. 10 is a circuit diagram of an antenna component 10*c*.
Figure 11:
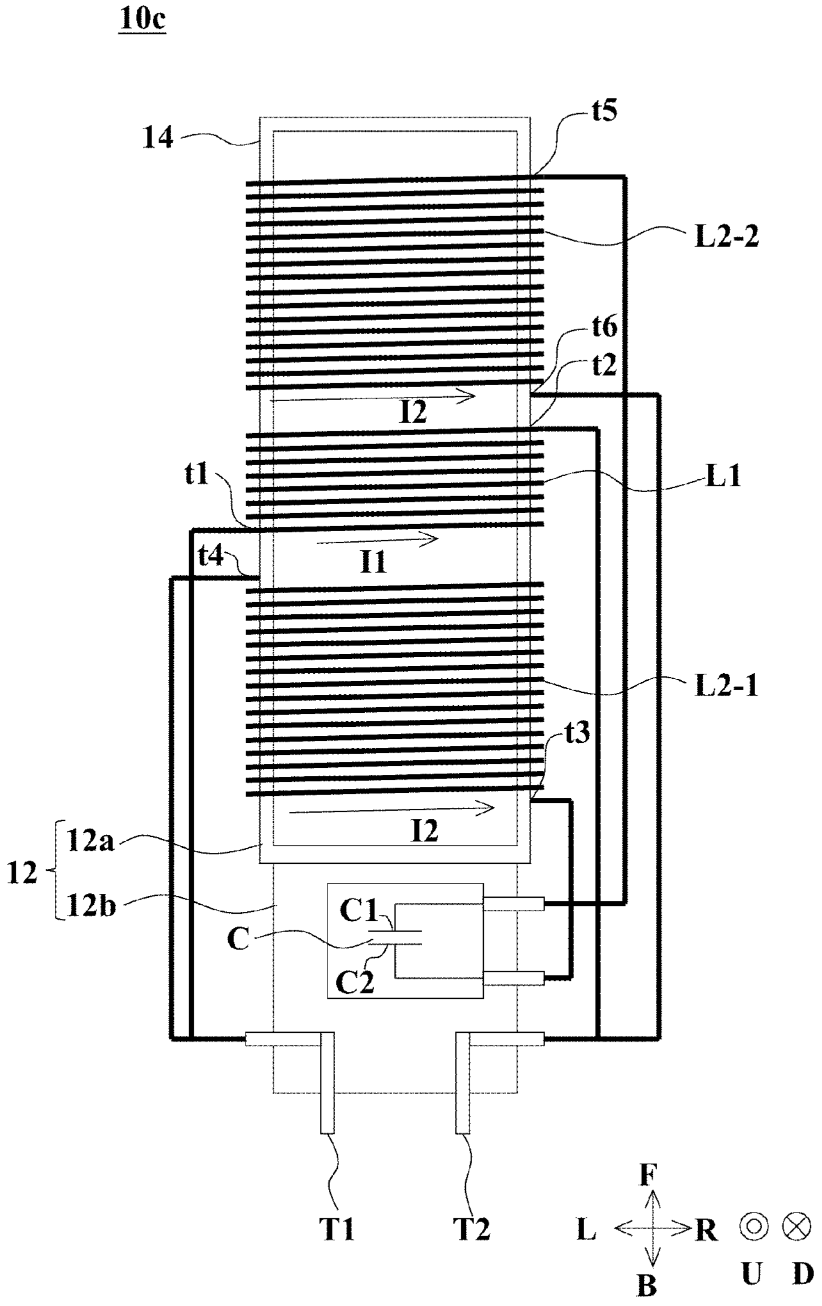
FIG. 11 is a top view of the antenna component 10*c*.

An antenna component 10*c* according to a third modification will be described here with reference to the drawings. FIG. 10 is a circuit diagram of the antenna component 10*c*. FIG. 11 is a top view of the antenna component 10*c*.

The antenna component 10*c* differs from the antenna component 10*b* in the position of the primary coil L1. More specifically, the second secondary coil L2-2, the primary coil L1, and the first secondary coil L2-1 are arranged in this order from the front to the back. The capacitor C is mounted on the upper main surface of the mounting portion 12*b*. The third end t3 of the first secondary coil L2-1 is electrically connected to the capacitor C. The fourth end t4 of the first secondary coil L2-1 is electrically connected to the first end t1 of the primary coil L1 and the first terminal T1. The fifth end t5 of the second secondary coil L2-2 is electrically connected to the capacitor C. The sixth end t6 of the second secondary coil L2-2 is electrically connected to the second end t2 of the primary coil L1 and the second terminal T2. Since the other structure of the antenna component 10*c* is the same as that of the antenna component 10*b*, a description of the other structure of the antenna component 10*c* is omitted herein. The antenna component 10*c* is capable of achieving the same effects and advantages as those of the antenna component 10*b*.

In the antenna component 10*c*, the second secondary coil L2-2, the primary coil L1, and the first secondary coil L2-1 are arranged in this order from the front to the back. Accordingly, the first secondary coil L2-1 and the second secondary coil L2-2 are adjacent to the primary coil L1. As a result, the first secondary coil L2-1 and the second secondary coil L2-2 are more strongly magnetically coupled to the primary coil L1.

(Fourth Modification)

Figure 12:
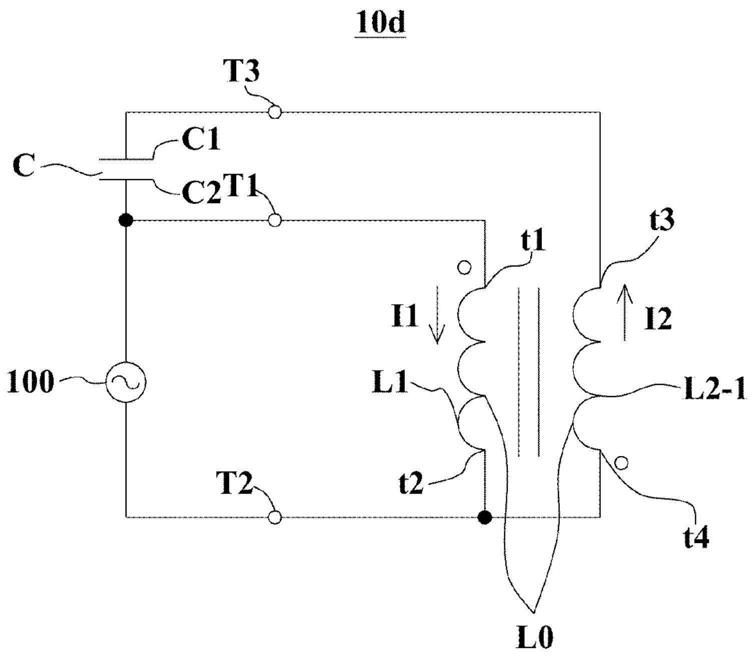
FIG. 12 is a circuit diagram of an antenna component 10*d*.

An antenna component 10*d* according to a fourth modification will be described here with reference to the drawing. FIG. 12 is a circuit diagram of the antenna component 10*d*.

The antenna component 10*d* differs from the antenna component 10 in that the antenna component 10*d* does not include the capacitor C. More specifically, the capacitor C is provided outside the antenna component 10*d*. The antenna component 10*d* further has a third terminal T3. The third terminal T3 is electrically connected to the third end t3 of the secondary coil. The capacitor C is connected to the first terminal T1 and the third terminal T3. The first capacitor electrode C1 is electrically connected to the third terminal T3. The second capacitor electrode C2 is electrically connected to the first terminal T1. Accordingly, the capacitor C forms a resonant circuit with the primary coil L1 and the first secondary coil L2-1. Since the other structure of the antenna component 10*c* is the same as that of the antenna component 10, a description of the other structure of the antenna component 10*d* is omitted herein. The antenna component 10*d* is capable of achieving the same effects and advantages as those of the antenna component 10.

Other Embodiments

The antenna components according to the present disclosure are not limited to the antenna components 10 and 10*a* to 10*d* and may be modified within the range of the scope of the present disclosure. The structures of the antenna components 10 and 10*a* to 10*d* may be arbitrarily combined.

In the antenna components 10 and 10*a*, the turning direction of the first secondary coil L2-1 may be opposite to the turning direction of the primary coil L1 when viewed in the front direction. In this case, the front end (the position of the t3 end in FIG. 2 and FIG. 7) of the first secondary coil L2-1 is electrically connected to the second terminal T2. The back end of the first secondary coil L2-1 is electrically connected to the capacitor C.

In the antenna component 10*b*, the turning direction of the first secondary coil L2-1 may be opposite to the turning direction of the primary coil L1 when viewed in the front direction. In this case, the front end of the second secondary coil L2-2 is electrically connected to the second terminal T2. The back end of the first secondary coil L2-1 is electrically connected to the first terminal T1.

In the antenna component 10*c*, the turning direction of the first secondary coil L2-1 may be opposite to the turning direction of the primary coil L1 when viewed in the front direction. In this case, the back end of the first secondary coil L2-1 is electrically connected to the first terminal T1. The front end of the first secondary coil L2-1 is electrically connected to the capacitor C.

The shape of the magnetic core 14 is not limited to the bar shape. The magnetic core 14 may have a cylindrical shape or a barrel shape having an elliptical cross section.

In the antenna component 10*b*, the capacitor C is not necessarily positioned between the first secondary coil L2-1 and the second secondary coil L2-2.

In the antenna component 10*a*, it is sufficient for the first secondary coil L2-1 to at least include the first secondary coil first portion L21 and the first secondary coil second portion L22. The first secondary coil L2-1 may include four or more secondary coil portions.

The signal source 100 generally has an output end and a ground end. However, the output end may be connected to the first terminal T1 and the ground end may be connected to the second terminal T2. Alternatively, the ground end may be connected to the first terminal T1 and the output end may be connected to the second terminal T2.

REFERENCE SIGNS LIST

10, 10*a* to 10*d* antenna component
12 main body
12*a* frame portion
12*b* mounting portion
14 magnetic core

100 signal source
C capacitor
C1 first capacitor electrode
C2 second capacitor electrode
I1 input current
I2 resonant current
L1 primary coil
L2-1 first secondary coil
L2-2 second secondary coil
L0 resonant coil
L21 first secondary coil first portion
L22 first secondary coil second portion
L23 first secondary coil third portion
T1 first terminal
T2 second terminal
T3 third terminal
t1 first end
t2 second end
t3 third end
t4 fourth end
t5 fifth end
t6 sixth end

What is claimed is:

1. An antenna component comprising:
a magnetic core;
a primary coil that is wound around the magnetic core, the primary coil having a first end and a second end;
a first secondary coil that is wound around the magnetic core, the first secondary coil having a third end electrically connected to the first end via a capacitor and a fourth end electrically connected to the second end;
a first terminal electrically connected to the first end;
a second terminal electrically connected to the second end; and
a second secondary coil connected in series to the capacitor and that is wound around the magnetic core and has a fifth end and a sixth end,
wherein the first terminal and the second terminal are configured to receive a signal to the antenna component,
wherein the capacitor forms a resonator circuit with the primary coil and the first secondary coil that is configured to cause a resonance when the signal has a resonance frequency of the resonator circuit,
wherein the third end is electrically connected to the first end via the capacitor and the second secondary coil,
wherein the fifth end is electrically connected to the third end via the capacitor, and
wherein the sixth end is electrically connected to the first end.

2. The antenna component according to claim 1, wherein a turning direction of the first secondary coil from the fourth end toward the third end is a same turning direction as the primary coil from the first end toward the second end.

3. The antenna component according to claim 1, wherein the capacitor is included in the antenna component.

4. The antenna component according to claim 1, wherein the capacitor is external to the antenna component.

5. The antenna component according to claim 1, wherein:
the magnetic core has a bar shape extending in a front-back direction of the antenna component; and
the first secondary coil and the primary coil are arranged in an order from a front to a back of the antenna component.

6. The antenna component according to claim 5, wherein:
the first secondary coil includes a first secondary coil first portion and a first secondary coil second portion; and
the first secondary coil first portion and the first secondary coil second portion are connected in series to each other and are arranged at intervals in the order from the front to the back.

7. The antenna component according to claim 1, wherein a turning direction of the second secondary coil from the sixth end toward the fifth end is a same turning direction as the primary coil from the first end toward the second end.

8. The antenna component according to claim 7, wherein:
the magnetic core has a bar shape extending in a front-back direction of the antenna component; and
the second secondary coil, the first secondary coil, and the primary coil are arranged in an order from a front to a back of the antenna component.

9. The antenna component according to claim 8, wherein the capacitor is positioned between the first secondary coil and the second secondary coil.

10. The antenna component according to claim 7, wherein:
the magnetic core has a bar shape extending in a front-back direction of the antenna component; and
the second secondary coil, the primary coil, and the first secondary coil are arranged in an order from a front to a back of the antenna component.

11. An antenna component comprising:
a magnetic core;
a primary coil wound around the magnetic core and having a first end and a second end;
a first secondary coil wound around the magnetic core and having a third end electrically connected to the first end via a capacitor and a fourth end electrically connected to the second end;
a first terminal electrically connected to the first end;
a second terminal electrically connected to the second end; and
a second secondary coil connected in series to the capacitor and that is wound around the magnetic core and has a fifth end and a sixth end,
wherein the capacitor forms a resonator circuit with the primary coil and the first secondary coil,
wherein the third end is electrically connected to the first end via the capacitor and the second secondary coil,
wherein the fifth end is electrically connected to the third end via the capacitor, and
wherein the sixth end is electrically connected to the first end.

12. The antenna component according to claim 11, wherein the first terminal and the second terminal are configured to receive a signal and the resonator circuit is configured to cause a resonance when the signal has a resonance frequency of the resonator circuit.

13. The antenna component according to claim 11, wherein a turning direction of the first secondary coil from the fourth end toward the third end is a same turning direction as the primary coil from the first end toward the second end.

14. The antenna component according to claim 11, wherein the capacitor is included in the antenna component.

15. The antenna component according to claim 11, wherein the capacitor is external to the antenna component.

16. The antenna component according to claim 11, wherein:
the magnetic core has a bar shape extending in a front-back direction of the antenna component, and
the first secondary coil and the primary coil are arranged in an order from a front to a back of the antenna component.

17. The antenna component according to claim 16, wherein:

the first secondary coil includes a first secondary coil first portion and a first secondary coil second portion, and the first secondary coil first portion and the first secondary coil second portion are connected in series and are arranged at intervals in the order from the front to the back of the antenna component.

18. The antenna component according to claim 11, wherein a turning direction of the second secondary coil from the sixth end toward the fifth end is a same turning direction as the primary coil from the first end toward the second end.

19. An antenna component comprising:

a magnetic core;

a primary coil that is wound around the magnetic core, the primary coil having a first end and a second end;

a first secondary coil that is wound around the magnetic core, the first secondary coil having a third end electrically connected to the first end via a capacitor and a fourth end electrically connected to the second end;

a first terminal electrically connected to the first end; and a second terminal electrically connected to the second end, wherein a turning direction of the first secondary coil from the fourth end towards the third end is a same turning direction as the primary coil from the first end towards the second end.

20. The antenna component according to claim 19, wherein the second end of the primary coil is connected to the fourth end of the first secondary coil, and the third end of the first secondary coil is connected to the capacitor.

21. The antenna component according to claim 19, wherein the antenna component is configured for transmission of a communication system.

* * * * *